(12) United States Patent
Tambasco et al.

(10) Patent No.: US 12,510,708 B2
(45) Date of Patent: Dec. 30, 2025

(54) BILAYER SILICON NITRIDE POLARIZATION MODE CONVERTER

(71) Applicant: Cisco Technology, Inc., San Jose, CA (US)

(72) Inventors: Jean-Luc J. Tambasco, Macungie, PA (US); Jonathan Edgar Roth, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 357 days.

(21) Appl. No.: 17/902,249

(22) Filed: Sep. 2, 2022

(65) Prior Publication Data

US 2024/0077674 A1 Mar. 7, 2024

(51) Int. Cl.
| | |
|---|---|
| *G02B 6/125* | (2006.01) |
| *G02B 6/126* | (2006.01) |
| *G02B 6/14* | (2006.01) |
| *G02B 6/12* | (2006.01) |

(52) U.S. Cl.
CPC ............. *G02B 6/126* (2013.01); *G02B 6/125* (2013.01); *G02B 6/14* (2013.01); *G02B 2006/12061* (2013.01); *G02B 2006/1215* (2013.01)

(58) Field of Classification Search
CPC .................................. G02B 6/125; G02B 6/14
USPC ............................................................ 385/11
See application file for complete search history.

(56) References Cited

U.S. PATENT DOCUMENTS

| | | | | |
|---|---|---|---|---|
| 5,418,867 A | * | 5/1995 | Van Der Tol | G02B 6/126 385/11 |
| 5,524,156 A |   | 6/1996 | Van Der Tol | |
| 5,696,856 A | * | 12/1997 | Van Der Tol | G02B 6/126 385/11 |
| 5,878,181 A | * | 3/1999 | Van Der Tol | G02F 1/3517 385/45 |
| 7,702,188 B2 | * | 4/2010 | Little | G02B 6/126 385/5 |
| 8,855,449 B1 |   | 10/2014 | Roth | |
| 9,091,813 B2 | * | 7/2015 | Dallesasse | G02B 6/105 |
| 9,122,006 B1 | * | 9/2015 | Roth | G02B 6/126 |
| 9,529,151 B2 | * | 12/2016 | Goi | G02B 6/126 |
| 9,817,186 B2 | * | 11/2017 | Kamei | G02B 6/1228 |

(Continued)

FOREIGN PATENT DOCUMENTS

WO   2021/222714 A1   11/2021

OTHER PUBLICATIONS

"Globalfoundries Silicon Photonics Platform," Global Foundries, Japan SOI Design Workshop, Oct. 25 & 26, 2018, 16 pages.
Sean P. Anderson, et al., "Silicon Photonic Polarization-Multiplexing Nanotaper for Chip-to-Fiber Coupling," IEEE Xplore, Journal of Lightwave Technology, JLT-17965-2015.R2, Nov. 2015, 7 pages.

(Continued)

*Primary Examiner* — Kaveh C Kianni
(74) *Attorney, Agent, or Firm* — Edell, Shapiro & Finnan, LLC

(57) ABSTRACT

A polarization rotator includes a bus waveguide disposed on a first layer having a longitudinal axis, a first end, and a second end, and a first upper waveguide and a second upper waveguide disposed on a second layer, above the first layer, the first upper waveguide and the second upper waveguide widening as the first upper waveguide and the second upper waveguide extend from the first end to the second end. The first upper waveguide and the second upper waveguide may also symmetrically bend toward each other and then away from each other proximate the second end.

20 Claims, 13 Drawing Sheets

(56) References Cited

U.S. PATENT DOCUMENTS

| | | | |
|---|---|---|---|
| 9,874,696 B2* | 1/2018 | Liu | G02B 6/30 |
| 9,989,702 B2* | 6/2018 | Doany | G02B 6/125 |
| 10,191,214 B2* | 1/2019 | Dong | G02B 6/2773 |
| 10,302,866 B2* | 5/2019 | Lin | G02B 6/126 |
| 10,345,522 B2* | 7/2019 | Daniel | G02B 6/1228 |
| 10,488,590 B2* | 11/2019 | Park | G02B 6/2766 |
| 10,667,987 B2 | 6/2020 | Dumais | |
| 10,677,987 B1* | 6/2020 | Dumais | G02B 6/276 |
| 10,841,012 B2* | 11/2020 | Wang | H04B 10/00 |
| 11,402,581 B2 | 8/2022 | Baba | |
| 11,409,044 B2* | 8/2022 | Su | G02B 6/126 |
| 11,747,559 B2* | 9/2023 | Bian | G02B 6/1228 385/43 |
| 2008/0226224 A1* | 9/2008 | Blauvelt | G02B 6/42 385/14 |
| 2010/0271634 A1 | 10/2010 | Dominguez Horna et al. | |
| 2014/0133796 A1* | 5/2014 | Dong | G02B 6/126 385/11 |
| 2016/0131842 A1* | 5/2016 | Mahgerefteh | G02B 6/136 385/11 |
| 2017/0199330 A1* | 7/2017 | Doany | G02B 6/1228 |
| 2018/0017732 A1* | 1/2018 | Tassaert | G02B 6/12004 |
| 2018/0149810 A1* | 5/2018 | Park | G02B 6/12007 |
| 2018/0314005 A1* | 11/2018 | Lin | G02B 6/126 |
| 2019/0025506 A1* | 1/2019 | Park | G02B 6/1228 |
| 2019/0222309 A1 | 7/2019 | Gross et al. | |
| 2019/0310424 A1* | 10/2019 | Lamponi | G02B 6/126 |
| 2021/0405308 A1* | 12/2021 | Bhargava | G02B 6/2934 |
| 2023/0251440 A1* | 8/2023 | Fini | G02B 6/4215 385/30 |
| 2023/0384519 A1* | 11/2023 | Huang | G02B 6/124 |

OTHER PUBLICATIONS

Wesley D. Sacher, et al., "Polarization rotator-splitters in standard active silicon photonics platforms," Optics Express, vol. 22, No. 4, DOI:10.1364/OE.22.003777, Feb. 24, 2014, 10 pages.

Kang Tan, et al., "Three-Dimensional Polarization Splitter and Rotator Based on Multi-Layer Si3N4-On-SOI Platform," IEEE, 978-1-5090-1035-6, Po2.4-1, 2016 International Conference on Optical Mems and Nanophotonics (OMN), Aug. 2016, 2 pages.

Daoxin Dai, et al., "Novel concept for ultracompact polarization splitter-rotator based on silicon nanowires," Optics Express, vol. 19, No. 11, May 23, 2011, 10 pages.

Luis Torrijos Moráan, "Photonic applications based on bimodal interferometry in periodic integrated waveguides," Doctoral Thesis, Universitat Politecnica de Valencia, Departamento de Comunicaciones, Jul. 2021, 210 pages.

Ding, et al., "Wideband polarization splitter and rotator with large fabrication tolerance and simple fabrication process," Optics Letters, vol. 38, No. 8, Apr. 15, 2013, 3 pages.

Ma, et al., "Symmetrical polarization splitter/rotator design and application in a polarization insensitive WDM receiver," Optics Express 16053, vol. 23, No. 12, Jun. 15, 2015, 11 pages.

Sacher, et al., "Polarization rotator-splitters and controllers in a Si3N4-on-SOI integrated photonics platform," Optics Express 11167, vol. 22, No. 9, May 5, 2014, 8 pages.

Sacher, et al., "Polarization rotator-splitters in standard active silicon photonics platforms," Optics Express 3777, vol. 22, No. 4, Feb. 24, 2014, 10 pages.

Wang D., et al., "Broadband and Compact Polarization Beam Splitter Based on an Asymmetrical Directional Coupler with Extra Optimizing Designs," Applied Optics, Optica Publishing Group, Oct. 17, 2019, vol. 58, No. 30, 2 pages.

* cited by examiner

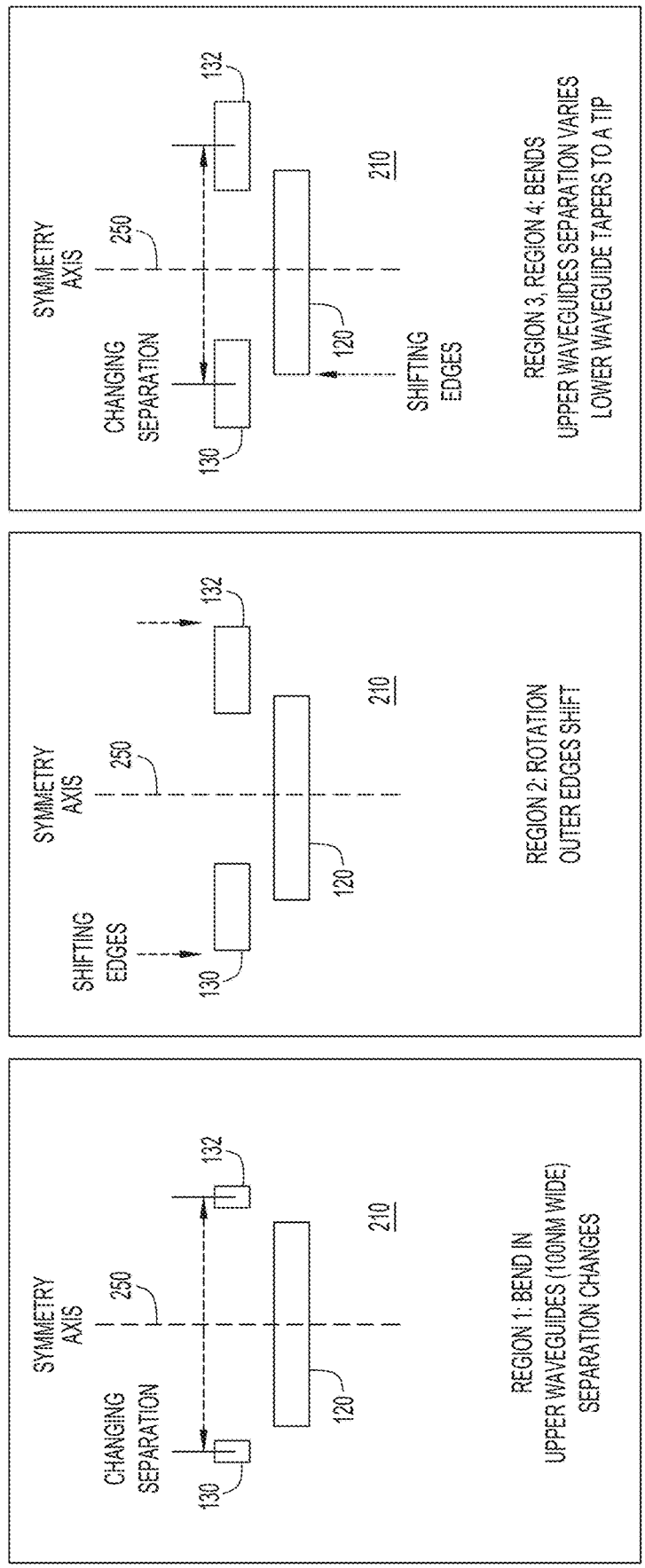

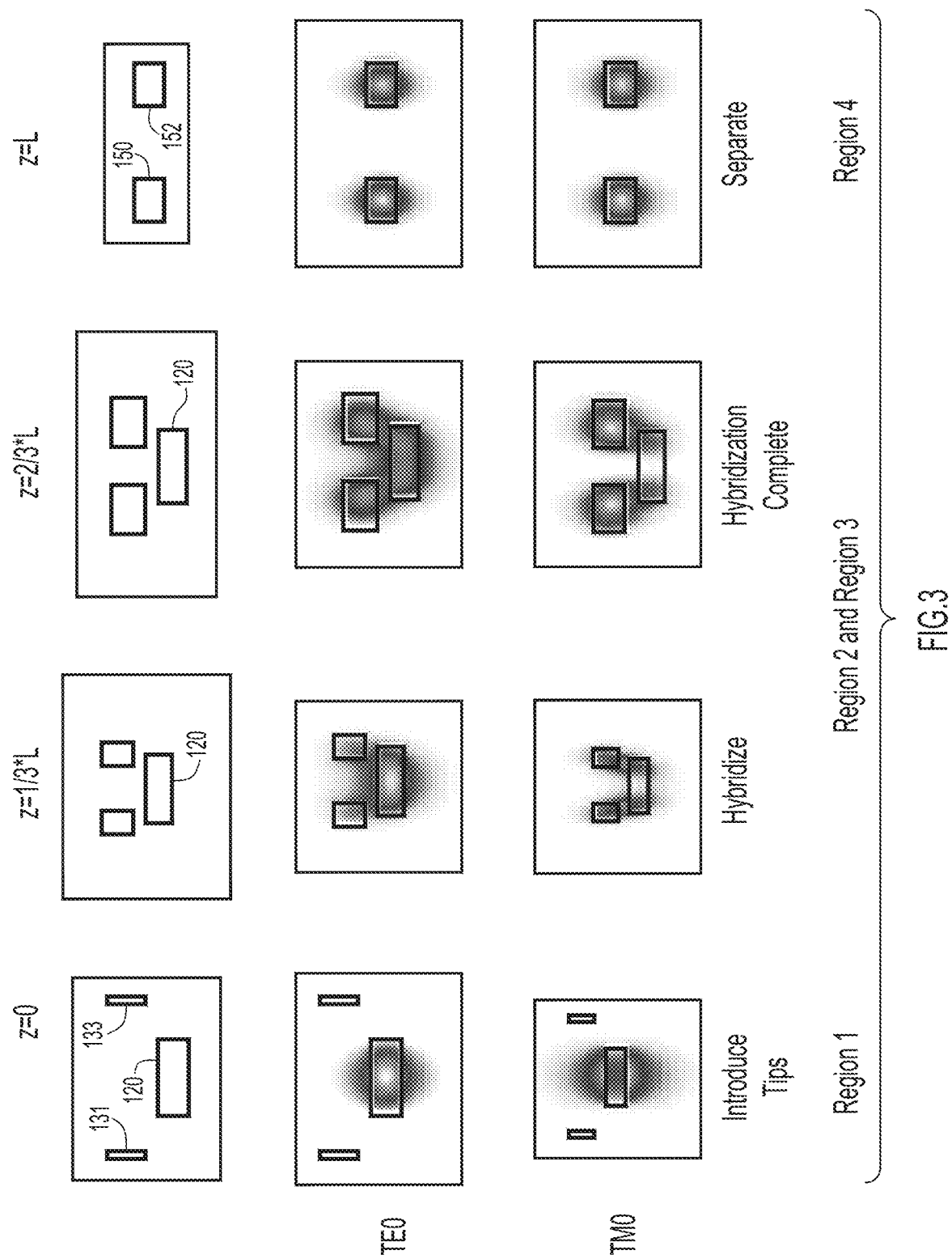

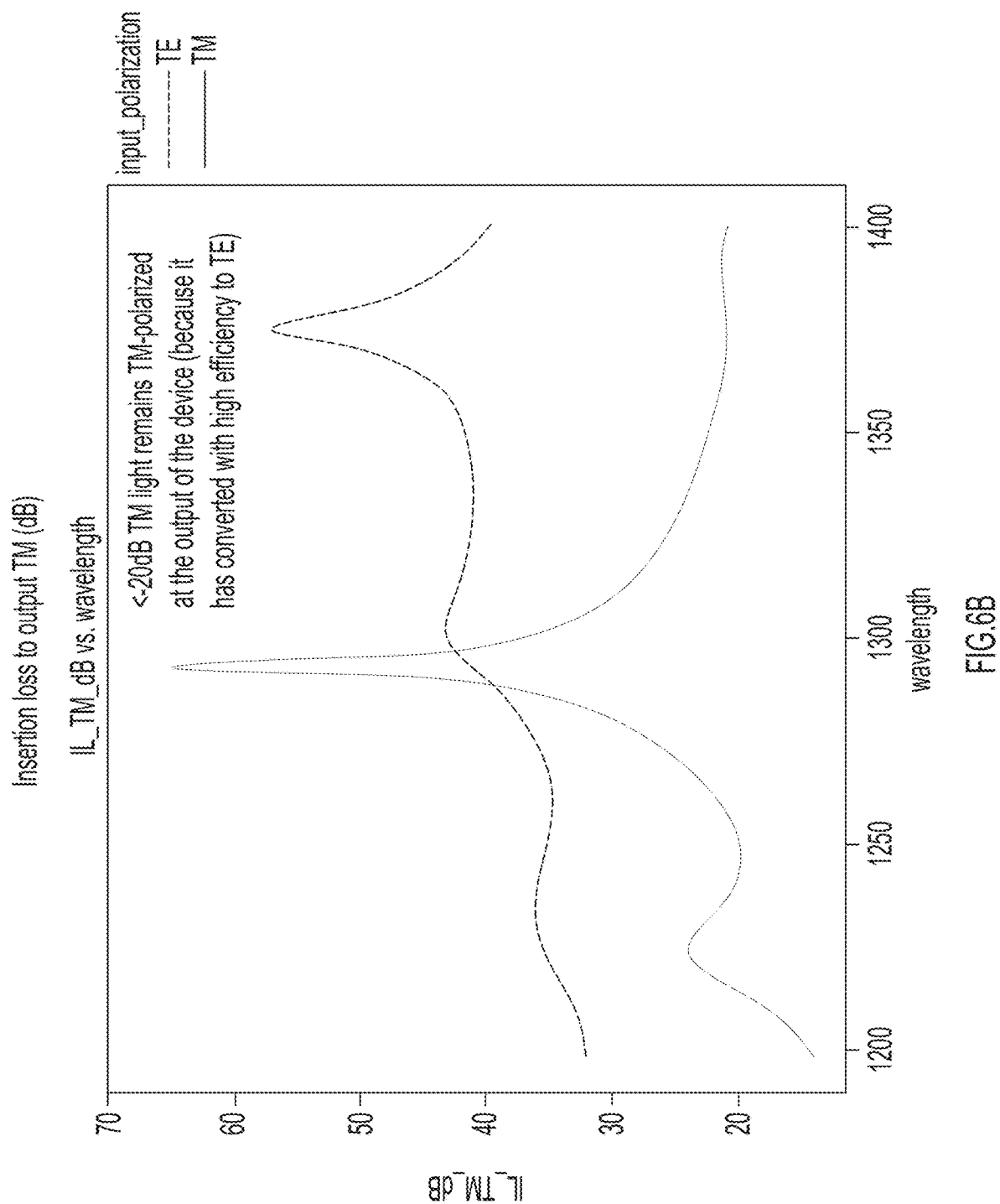

BILAYER SILICON NITRIDE POLARIZATION MODE CONVERTER

TECHNICAL FIELD

Embodiments described herein are directed to a photonic polarization rotator or mode converter.

BACKGROUND

A key component of an optical receiver is a polarization splitter rotator (PSR), which transforms a single waveguide carrying both transverse electric (TE) and transverse magnetic (TM) optical modes into two isolated waveguides carrying TE polarized light. To be effective, a PSR should be low loss. However, a PSR is one of the more lossy components of an optical receiver, limiting its overall performance.

In some designs, a PSR is implemented using crystalline silicon, poly-silicon, and silicon nitride. The silicon, especially the poly-silicon, heavily limits the overall achievable performance of the PSR due to, among other things, intrinsic scattering and absorption of the silicon (limits insertion loss), large back scattering from poly-silicon (limits return loss), and 2-photon absorption, which limits the applications in which the PSR can be used, i.e., it may be difficult to implement a PSR on a transmitter where the optical power in the waveguide is high.

Functionally, a typical PSR features a rotator, which rotates TM0 mode light into TE1 mode light, followed by a mode separator (often referred to as "modemux"). The modemux is configured, e.g., to convert the TE1 mode light into TE0 mode light of an isolated waveguide. The length of the modemux is usually in the range of 100-200 μm and adds complexity and insertion loss to the overall design. Notably, the insertion loss associated with a modemux is often higher for the TE1 mode than for the TE0 mode, and thus worsens the polarization-dependent loss (PDL) of the PSR. That is, TE0->TE0 mode light passing through the PSR usually experiences very low loss, as it does not rotate and simply passes through.

BRIEF DESCRIPTION OF THE DRAWINGS

FIGS. 2A, 2B, and 2C show, respectively, cross-sectional views at A-A, B-B, C-C of FIG. 1, according to an example embodiment.

FIG. 3 shows simulated optical power of TE0 and TM0 mode light signals passing through waveguides of the polarization rotator, according to an example embodiment.

FIGS. 6A and 6B show insertion loss metrics for the polarization rotator, according to an example embodiment.

DETAILED DESCRIPTION

Overview

Figure 1:
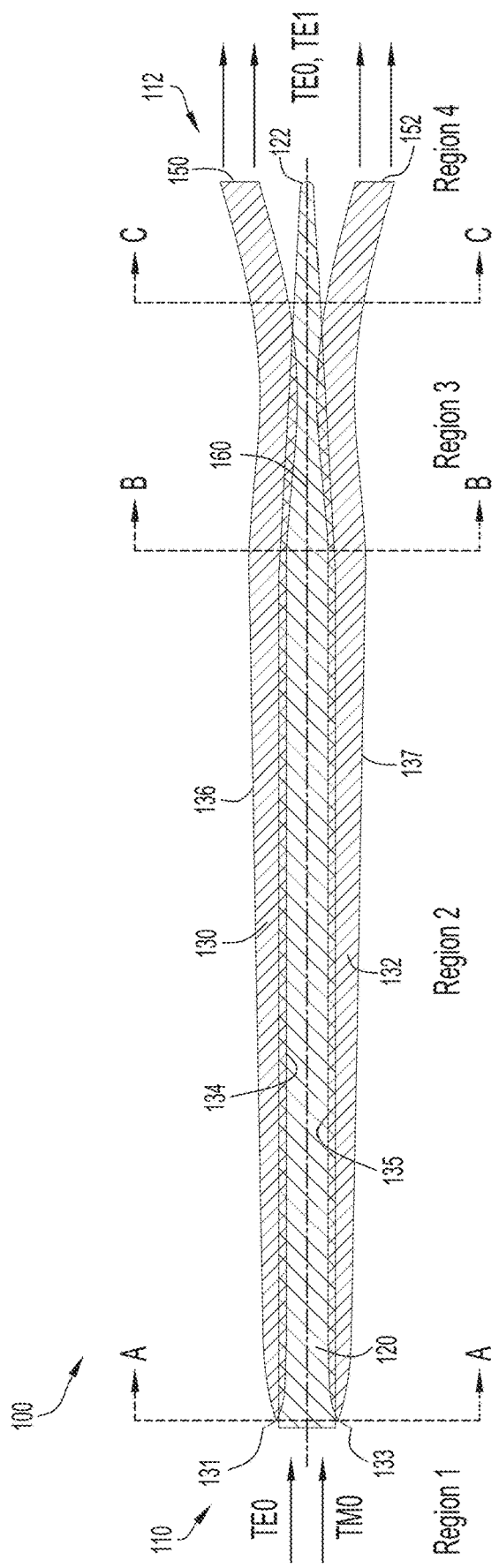
FIG. 1 shows a plan view of a polarization rotator, according to an example embodiment.

Presented herein is a polarization rotator that includes a bus waveguide disposed on a first layer of the substrate, the bus waveguide having a longitudinal axis, a first end, and a second end, and a first upper waveguide and a second upper waveguide disposed on a second layer, above the first layer, the first upper waveguide and the second upper waveguide widening as the first upper waveguide and the second upper waveguide extend from the first end to the second end.

In another embodiment, a polarization rotator includes a bus waveguide having a first end and a second end, and a pair of waveguides that overlie the bus waveguide and that are translated over the bus waveguide, wherein the pair of waveguides symmetrically bend toward each other and then away from each other proximate the second end of the bus waveguide.

In still another embodiment, a method is provided. The method includes receiving a light signal at first end of a bus waveguide that extends in a longitudinal direction and narrows to a tip towards a second end of the bus waveguide, the light signal comprising both transverse electric mode light and transverse magnetic mode light, and mode hybridizing the light signal received in the bus waveguide using a pair of waveguides that overlie the bus waveguide and that are translated over the bus waveguide, wherein the pair of waveguides widen as the pair of waveguides extend from the first end of the bus waveguide to the second end of the bus waveguide. The pair of waveguides may also symmetrically bend toward each other and then away from each other proximate the second end of the bus waveguide.

Example Embodiments

Described below is a polarization rotator that foregoes the isolation of the TE0 and TE1 modes to their own respective single mode waveguides using a modemux, in favor of a decreased device footprint.

As will be described in more detail below, a polarization rotator includes a "bus" waveguide on a lower layer that remains substantially unchanged along the length of the device. The bus waveguide supports at least TE0 and TM0 guided modes. A pair of waveguides on an upper layer are translated over the bus waveguide in an optimized and symmetric fashion causing TM0 mode light to become TE1 mode light via mode hybridization. The output of the polarization rotator comprises two uncoupled single mode waveguides on only the upper layer, each containing some amount of TE-polarized optical power. Notably, the bus waveguide and the upper pair of waveguides may all be fabricated from silicon nitride. The disclosed device is relatively short (i.e., on the order of 350-400 μm), presents low loss and low polarization dependent loss, is high-power handling (due to the absence of silicon and use of silicon nitride), and operates well across the O-band. Those skilled in the art will appreciate that the terms "lower layer" and "upper layer" are merely meant to denote a relationship between layers, not necessarily that one layer is above another layer. In other words, the final polarization rotator, in use, may be oriented such that the described "upper layer" is actually below the "lower layer."

Reference is now made to the figures, beginning with FIG. 1, which shows a plan view of a polarization rotator 100, according to an example embodiment, and to FIGS. 2A, 2B, and 2C, which show, respectively, cross-sectional views at A-A, B-B, C-C of FIG. 1, according to an example embodiment. Polarization rotator 100 includes an input end 110 and an output end 112. Four regions, Region 1, Region 2, Region 3, and Region 4 are indicated in FIG. 1 to denote different portions of the polarization rotator 100. Those skilled in the art will appreciate, however, that these denoted regions are merely meant to help describe the polarization rotator 100, and are not meant to suggest any clear or specific boundaries between the different regions, or that any particular functionality is performed exclusively in any given region.

As shown in FIG. 1, a bus waveguide 120 on a lower layer extends from the input end 110 towards the output end 112. Bus waveguide 120 has a substantially rectangular cross section, which remains substantially unchanged along its length, until bus waveguide 120 approaches output end 112, where bus waveguide 120 narrows or tapers to a tip 122.

A first upper waveguide 130 and a second upper waveguide 132, on an upper layer, also extend from input end 110 towards output end 112, and at least partially overlie bus waveguide 120. At input end 110, and in Region 1, first upper waveguide 130 and second upper waveguide 132 each have a tip end 131, 133, which bend in towards a longitudinal axis 160 of bus waveguide 120. Then, in Region 2, as first upper waveguide 130 and second upper waveguide 132 extend toward output end 112, inner edges 134, 135 of first upper waveguide 130 and second upper waveguide 132 remain substantially unchanged (but could also translate), while outer edges 136, 137 shift outwards away from longitudinal axis 160. Also, as shown in FIGS. 2A, 2B, and 2C, first upper waveguide 130 and second upper waveguide 132 may be unequally offset from each other with respect to a symmetry axis 250 of the polarization rotator 100 or longitudinal axis 160.

In Region 3, first upper waveguide 130 and second upper waveguide 132 bend in towards longitudinal axis 160 as bus waveguide 120 begins to narrow to tip 122. In Region 4, first upper waveguide 130 and second upper waveguide 132 bend out and away from longitudinal axis 160, and end in first output 150 and second output 152.

In an embodiment, bus waveguide 120, first upper waveguide 130 and second upper waveguide 132 of polarization rotator 100 are arranged/patterned/defined on/in a low index, e.g., silicon dioxide cladding 210 (shown in FIGS. 2A, 2B, and 2C) and may be composed of silicon nitride.

In one implementation, designed for the O-band spectrum, bus waveguide 120 is about 1.5 µm wide and about 250 nm thick. First upper waveguide 130 and second upper waveguide 132 are also about 250 nm thick. At tip ends 131, 133, first upper waveguide 130 and second upper waveguide 132 are about 100 nm wide. As first upper waveguide 130 and second upper waveguide 132 widen in Region 2 as they extend towards output end 112, their greatest width is on the order of 900 nm, which may also be their respective widths at first output 150 and at second output 152. A 100 nm thick layer of cladding 210, separates bus waveguide 120 from first upper waveguide 130 and second upper waveguide 132. In this particular implementation, Region 2 (between A-A and B-B) may have a length on the order of 300 µm, and Region 3 (between B-B and C-C) may have a length on the order of 70 µm. It is noteworthy that the optical grade bus waveguide 120, the first upper waveguide 130, and second upper waveguide 132 are independently patterned such that in some cross-sections of the device only first upper waveguide 130 and/or second upper waveguide 132 is present, in other cross-sections each of first upper waveguide 130, second upper waveguide 132, and bus waveguide 120 are present, and in still other cross-sections only bus waveguide 120 is present.

In operation, and as shown in FIG. 1, an arbitrary ratio of TE0 and TM0 polarized light enters or is introduced at polarization rotator 100 at input end 110 and is directed towards bus waveguide 120. As the light travels down bus waveguide 120, first upper waveguide 130 and second upper waveguide 132 are arranged, as described, in an optimized and symmetric fashion to cause the TM0 mode to become TE1 mode via mode hybridization. The output of the polarization rotator 100 provides two uncoupled single mode waveguides, namely first output 150 and second output 152, on only an upper layer, each containing some arbitrary amount of TE-polarized optical power.

FIG. 3 shows simulated optical power of TE0 and TM0 mode light signals passing through waveguides of the polarization rotator 100, according to an example embodiment. The top row of FIG. 3 shows cross sections of bus waveguide 120, first upper waveguide 130, and second upper waveguide 132, at tip ends 131, 133 in Region 1, in Regions 2 and 3, and in Region 4 at first output 150 and second output 152. Z corresponds to a distance along a length of polarization rotator 100, which has a total length L. As can be seen from the figure, TE0 mode light introduced at bus waveguide 120 passes through the device and exits substantially entirely at first output 150 and second output 152. TM0 mode light introduced at the bus waveguide 120 is hybridized in Regions 2 and 3, and output as TE1 mode light at first output 150 and second output 152. It is noted that bus waveguide 120 guides both the TE0 and IMO modes.

Figure 4A:
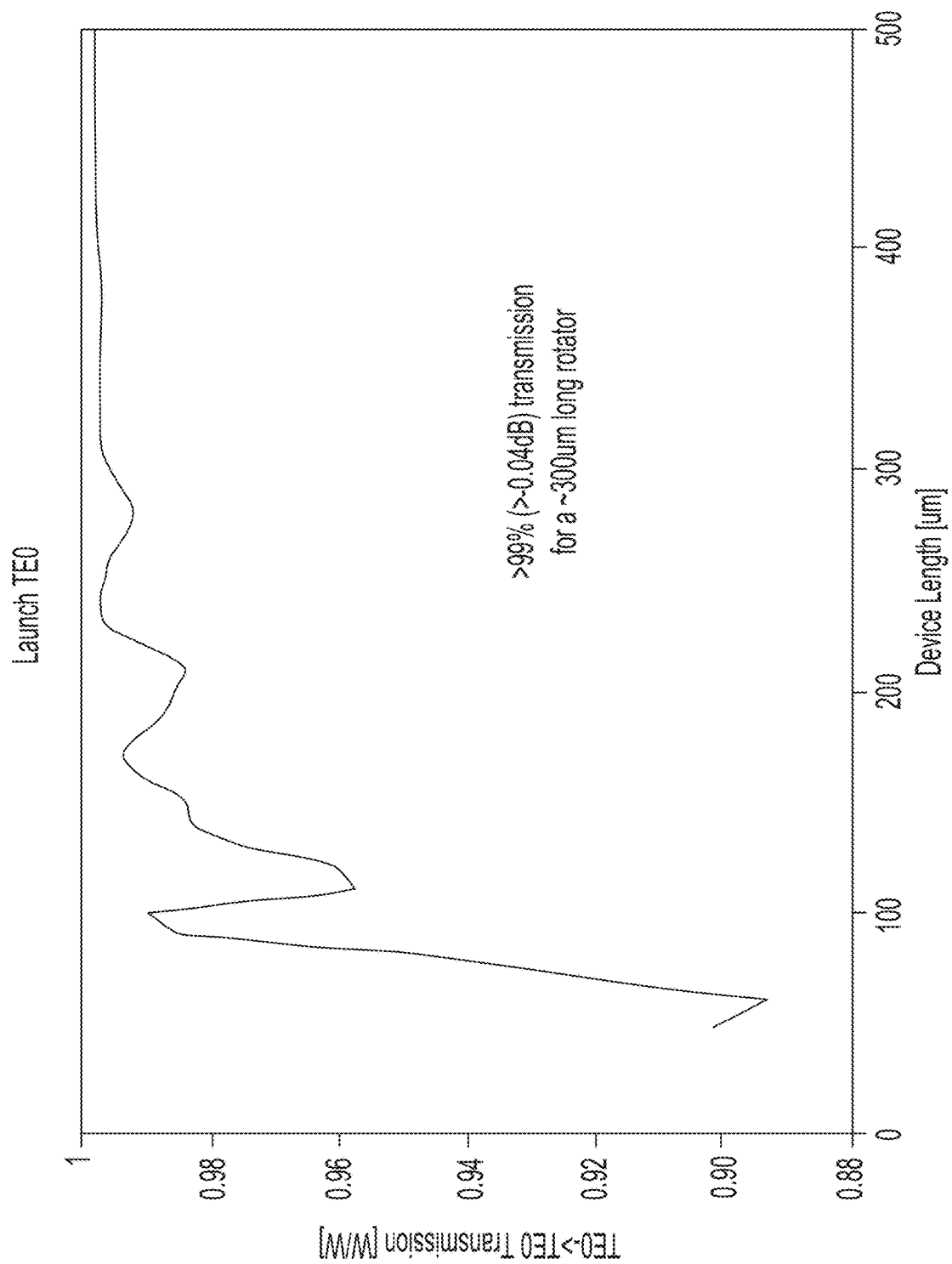
FIGS. 4A and 4B show simulated power associated with TE0 mode light passing through waveguides of the polarization rotator, according to an example embodiment.
Figure 4B:
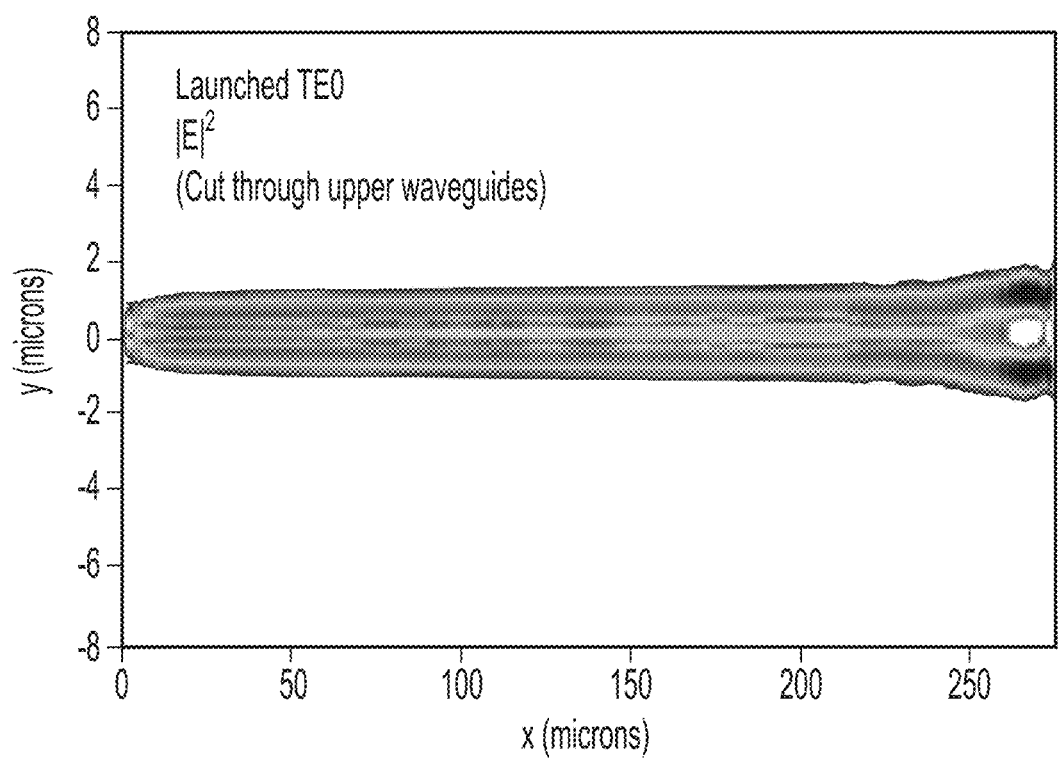

FIGS. 4A and 4B show simulated power associated with TE0 mode light passing through waveguides of the polarization rotator, according to an example embodiment. As shown in FIG. 4A, over 99% of the TE0 mode light passes through the device.

Figure 5A:
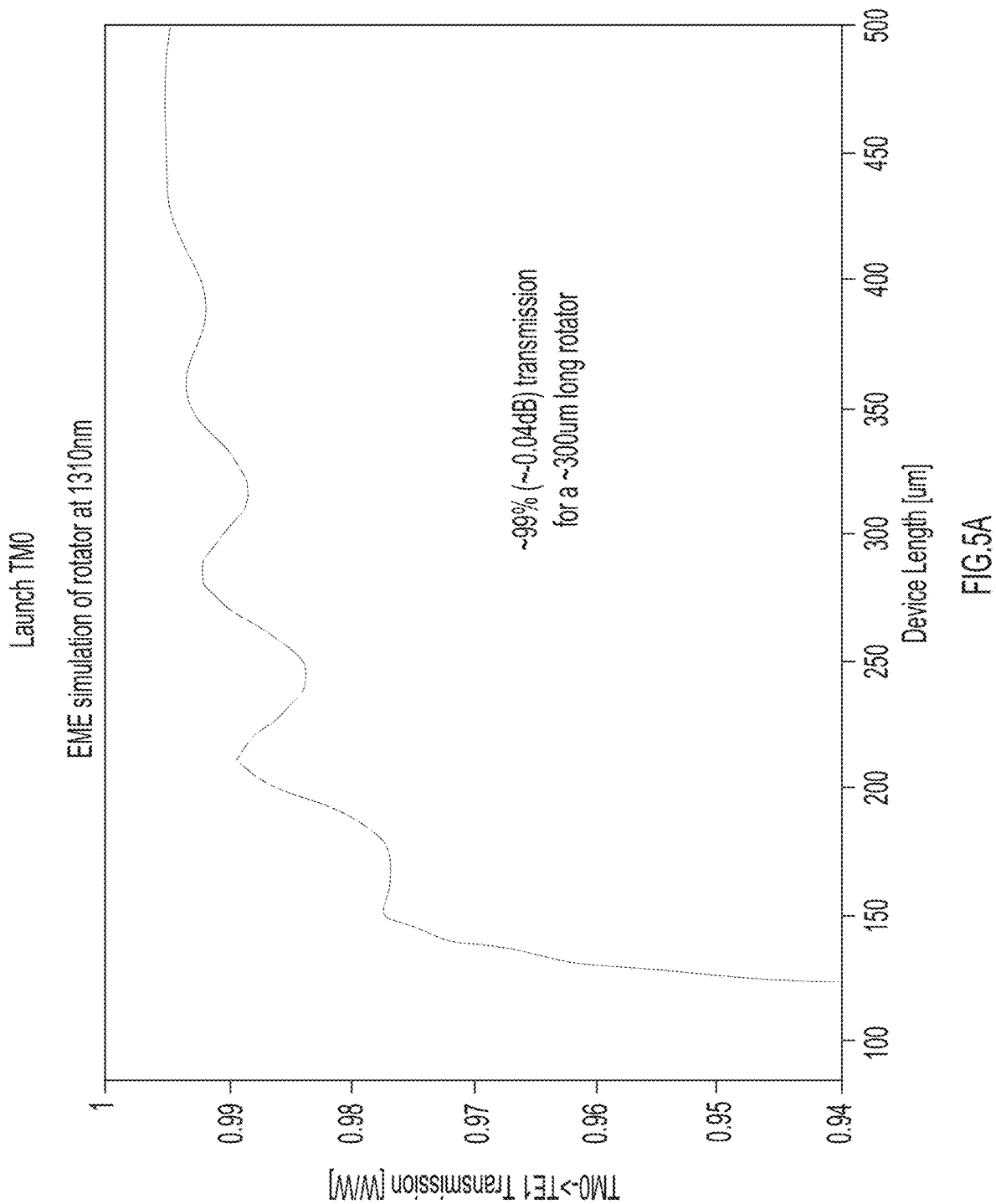
FIGS. 5A, 5B, and 5C show simulated power associated with TM0 mode light passing through waveguides of the polarization rotator, according to an example embodiment.
Figure 5B:
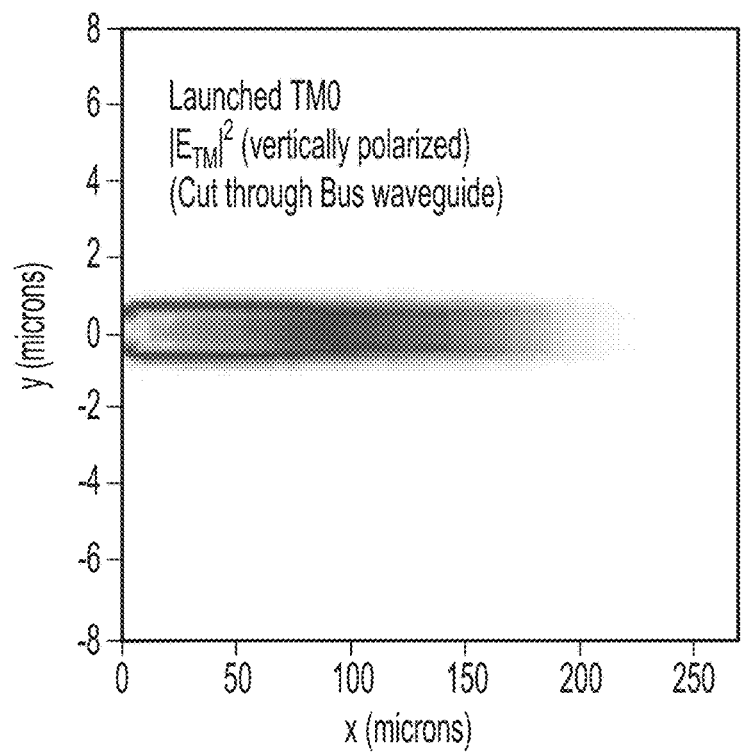
Figure 5C:
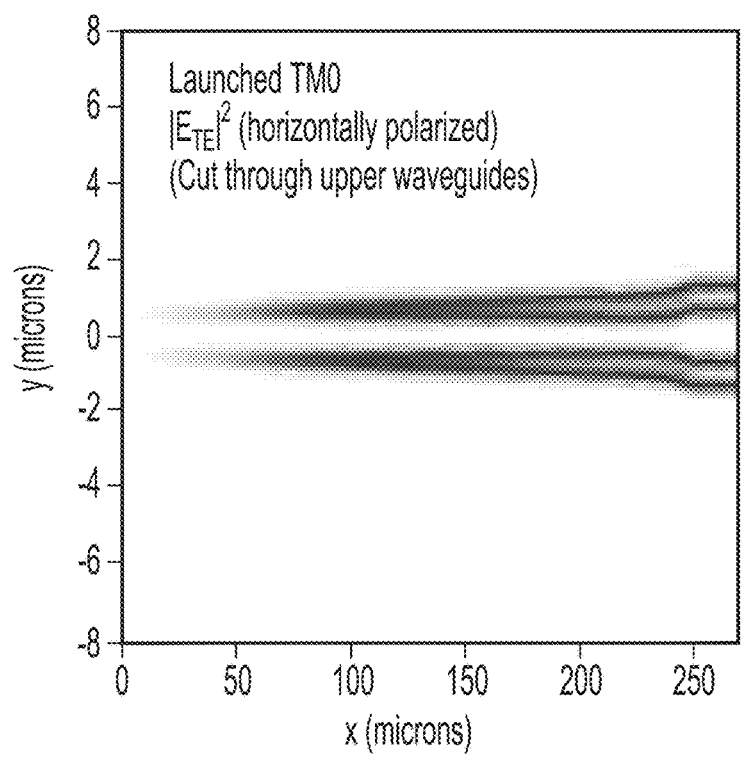

EEGs. 5A, 5B, and 5C show simulated power associated with TM0 mode light passing through waveguides of the polarization rotator 100, according to an example embodiment. As shown in FIG. 5A, approximately 99% of the TM0 mode light is passed through the device.

Figure 6A:
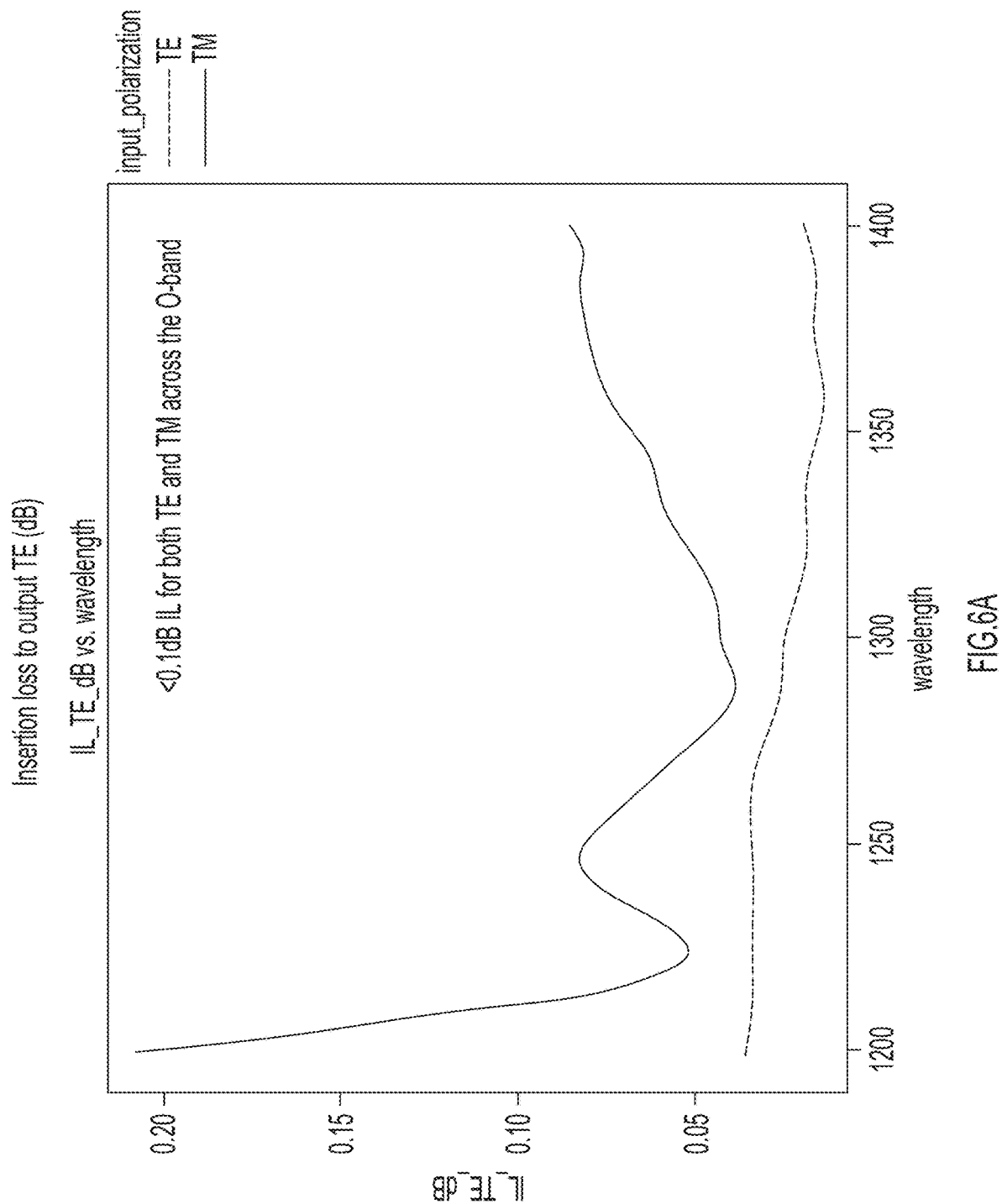

FIGS. 6A and 6B show insertion loss metrics for the polarization rotator 100, according to an example embodiment. FIG. 6A shows that there is less than 0.1 dB insertion loss for both TE and TM mode light in the O-band that passes through the device. FIG. 6B shows that less than −20 dB of TM mode light remains TM-polarized at the output of polarization rotator 100.

Figure 7:
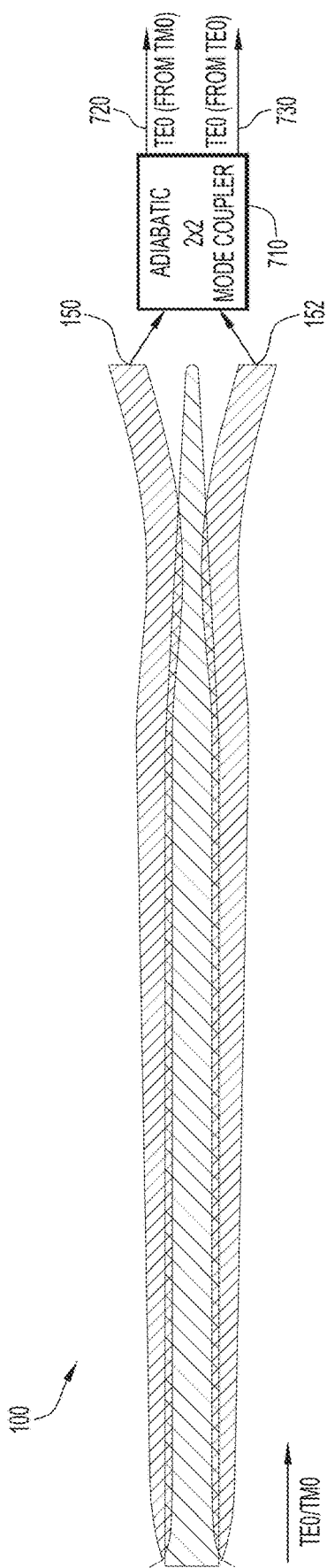
FIG. 7 shows the polarization rotator used in one possible implementation according to a second example embodiment.

FIG. 7 shows polarization rotator 100 used in one possible implementation according to a second example embodiment. As shown, first output 150 and second output 152 are arranged to supply their respective optical signals to an adiabatic 2×2 mode coupler 710, which is configured to output TE0 mode light 720 (from originally input TM0 mode light), and TE0 mode light 730 (from originally input TE0 mode light). This ultimate output provides separated waveguides discriminating between the originally supplied TE0 and TM0 mode light.

Figure 8:
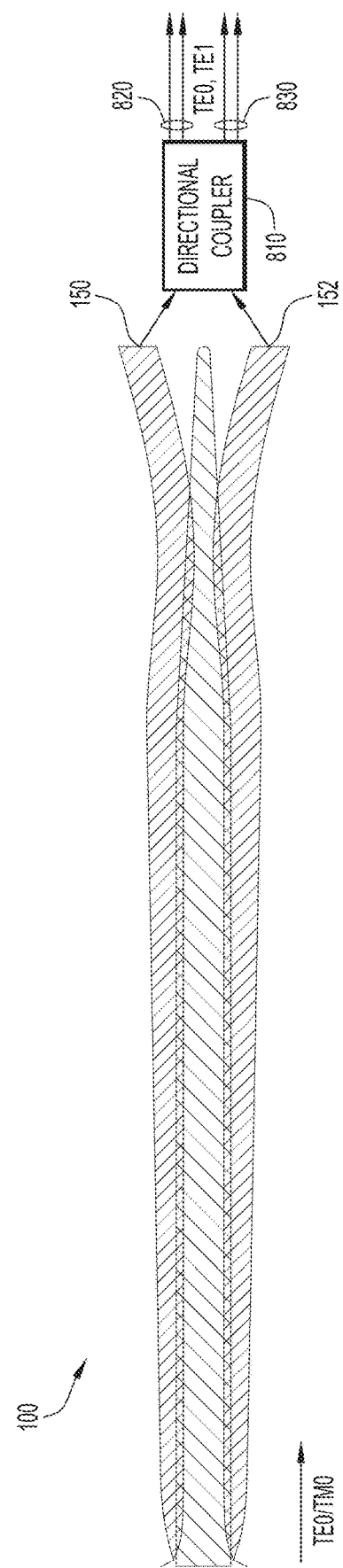
FIG. 8 shows the polarization rotator used in a second possible implementation according to a third example embodiment.

FIG. 8 shows polarization rotator 100 used in a second possible implementation according to a third example embodiment. As shown, first output 150 and second output 152 are arranged to supply their respective optical signals to a directional coupler 810, which is configured to create a predetermined delay (e.g., group delay) between the TE0 and TE1 outputs of the polarization rotator 100.

Figure 9:
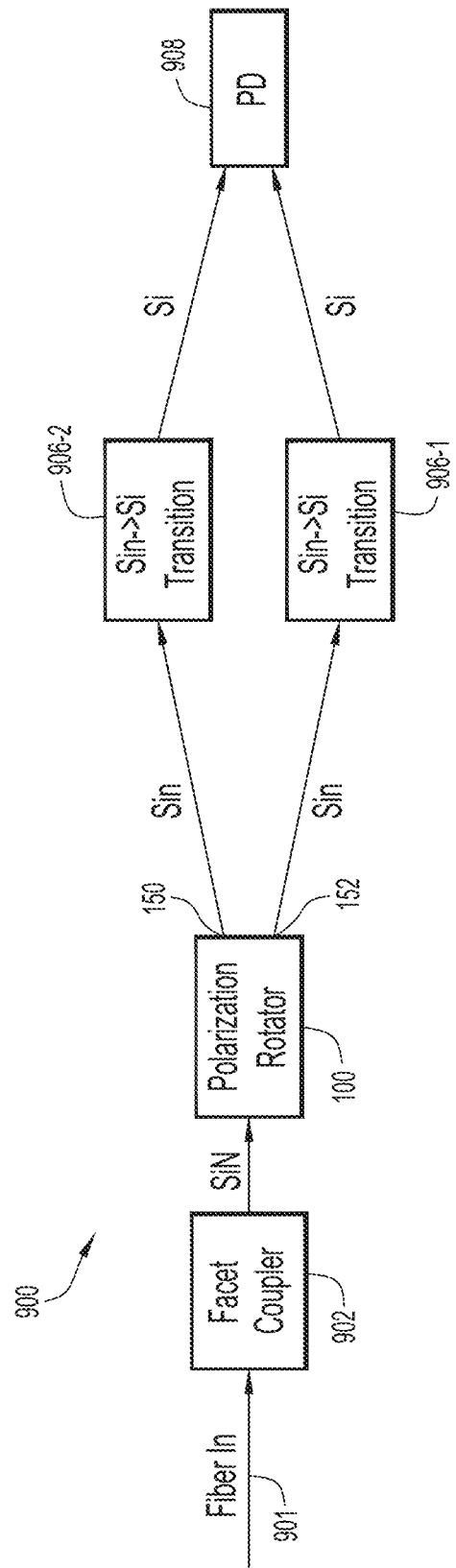
FIG. 9 is block diagram of a receiver use case for the polarization rotator, according to an example embodiment.

FIG. 9 is block diagram of a receiver 900 use case for polarization rotator 100, according to an example embodiment. As shown, a facet coupler 902 receives light from single-mode fiber 901 and delivers a mixed TE0/TM0 optical signal via a silicon nitride (SiN) waveguide to polarization rotator 100. Polarization rotator 100, in turn, rotates the received TM0 mode light to TE1 mode light, passes TE0 mode light, and outputs combined TE0 and TE1 mode light on each of its first output 150 and second output 152, via silicon nitride waveguides to SiN Silicon (Si) transitions 906-1, 906-2, respectively, and then outputs thereof are provided to a photodiode (PD) 908.

Figure 10:
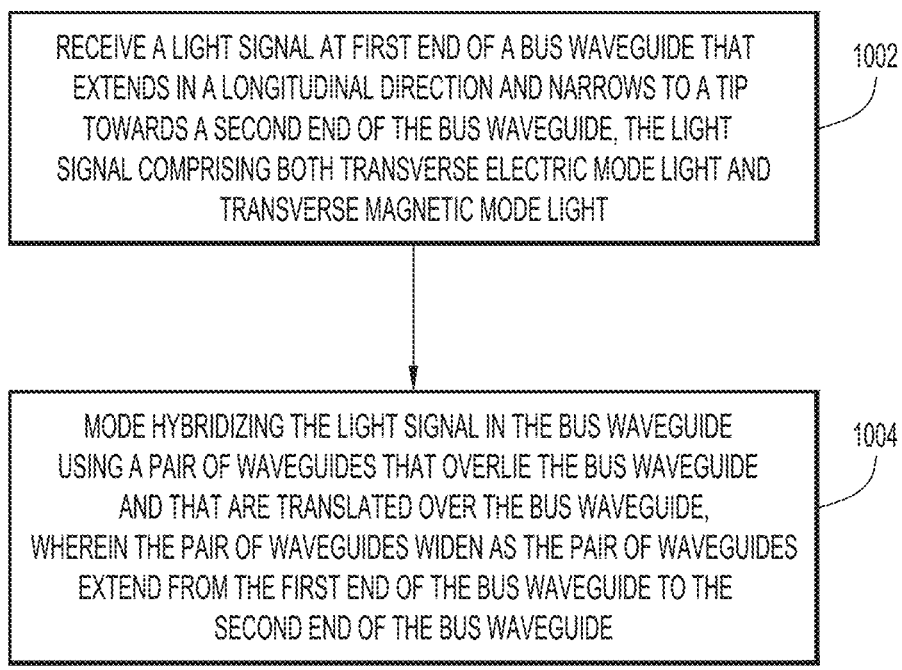
FIG. 10 is a flowchart showing a series of operations for processing light with a polarization rotator, according to an example embodiment.

FIG. 10 is a flowchart showing a series of operations for processing light with a polarization rotator, according to an example embodiment. At 1002 an operation is configured to receive a light signal at first end of a bus waveguide that extends in a longitudinal direction and narrows to a tip towards a second end of the bus waveguide, the light signal comprising both transverse electric mode light and transverse magnetic mode light. At 1004, an operation is configured to mode hybridize the light signal received by the bus waveguide using a pair of waveguides that overlie the bus waveguide and that are translated over the bus waveguide, wherein the pair of waveguides widen as the pair of waveguides extend from the first end of the bus waveguide to the second end of the bus waveguide.

Bus waveguide 120, first upper waveguide 130, and second upper waveguide 132 may be made of dielectric materials such as SiN or SiON (silicon oxynitride), or crystalline materials such as Si or LiNbO3 or InP. Bus waveguide 120, first upper waveguide 130, and second upper waveguide 132 may be composed of identical or different materials. Bus waveguide 120, first upper waveguide 130, and second upper waveguide 132 may have identical or different thicknesses.

Also, it is noted that polarization rotator 100 can operate in either direction. From left to right in FIG. 1, it operates as a demultiplexer (two modes on one waveguide to one mode on each of two waveguides). From right to left in FIG. 1, it operates as a multiplexer (one mode on each of two waveguides to two modes on one waveguide.

Variations and Implementations

Embodiments described herein may include or be part of one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a device is provided and includes a bus waveguide disposed on a first layer, the bus wavguide having a longitudinal axis, a first end, and a second end, and a first upper waveguide and a second upper waveguide disposed on a second layer, above the first layer, the first upper waveguide and the second upper waveguide widening as the first upper waveguide and the second upper waveguide extend from the first end to the second end.

In the device, the first upper waveguide and a second upper waveguide symmetrically bend toward each other and then away from each other proximate the second end.

The bus waveguide may narrow proximate the second end.

In a first region of the device, cross-sectional dimensions of the bus waveguide remain substantially unchanged.

The bus waveguide may be configured to carry transverse electric optical mode light and transverse magnetic optical mode light.

The bus waveguide may be comprised of silicon nitride.

The first upper waveguide and the second upper waveguide may be configured to hybridize transverse magnetic mode light, introduced into the first end of the bus waveguide, to transverse electric mode light.

The first upper waveguide and the second upper waveguide may be configured to pass transverse electric mode light introduced into the first end of the bus waveguide.

In the device, inner edges of the first upper waveguide and the second upper waveguide may remain substantially unchanged as the first upper waveguide and the second upper waveguide extend from the first end to the second end.

In the device, outer edges of the first upper waveguide and the second upper waveguide may translate away from the longitudinal axis as the first upper waveguide and the second upper waveguide extend from the first end to the second end.

In another embodiment, a device includes a bus waveguide having a first end and a second end; and a pair of waveguides that overlie the bus waveguide and that are translated over the bus waveguide, wherein the pair of waveguides symmetrically bend toward each other and then away from each other proximate the second end of the bus waveguide.

In the device, the pair of waveguides may widen as the pair of waveguides extend from the first end of the bus waveguide to the second end of the bus waveguide.

In the device, the bus waveguide may be configured to carry transverse electric optical mode light and transverse magnetic optical mode light.

The bus waveguide may be comprised of silicon nitride.

In the device, the pair of waveguides may be configured to hybridize transverse magnetic mode light, introduced into the first end of the bus waveguide, to transverse electric mode light.

In the device, inner edges of the pair of waveguides may remain substantially unchanged as the pair of waveguides extend from the first end to the second end.

In the device, outer edges of the pair of waveguides may translate away from a longitudinal axis of the bus waveguide as the pair of waveguides extend from the first end to the second end.

A method may also be provided and includes receiving a light signal at first end of a bus waveguide that extends in a longitudinal direction and narrows to a tip towards a second end of the bus waveguide, the light signal comprising both transverse electric mode light and transverse magnetic mode light; and mode hybridizing the light signal received by the bus waveguide using a pair of waveguides that overlie the bus waveguide and that are translated over the bus waveguide, wherein the pair of waveguides widen as the pair of waveguides extend from the first end of the bus waveguide to the second end of the bus waveguide.

The method may further include mode hybridizing the transverse magnetic mode light to transverse electric mode light.

The method may also include outputting transverse electric mode light on the pair of waveguides.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device, comprising:
a bus waveguide disposed on a first layer, the bus waveguide having a first end, a second end, and a longitudinal axis that extends between the first end and the second end; and
a first upper waveguide and a second upper waveguide disposed on a second layer, above the first layer, the first upper waveguide having a first inner arcuate edge and a first outer arcuate edge and the second upper waveguide having a second inner arcuate edge and a second outer arcuate edge, the first upper waveguide and the second upper waveguide widening as the first upper waveguide and the second upper waveguide extend from the first end to the second end,
wherein the first upper waveguide and the second upper waveguide symmetrically bend toward each other and then away from each other across the longitudinal axis, proximate the second end, such that an inner distance between the first inner arcuate edge and the second inner arcuate edge decreases and then increases as the first upper waveguide and the second upper waveguide extend from the first end to the second end, and such that an outer distance between the first outer arcuate edge and the second outer arcuate edge decreases and then increases as the first upper waveguide and the second upper waveguide extend from the first end to the second end, and
wherein at least the first inner arcuate edge and the second inner arcuate edge overlap the bus waveguide.

2. The device of claim 1, wherein the bus waveguide narrows proximate the second end.

3. The device of claim 1, wherein, in a first region of the device, cross-sectional dimensions of the bus waveguide remain substantially unchanged.

4. The device of claim 1, wherein the bus waveguide is configured to carry transverse electric optical mode light and transverse magnetic optical mode light.

5. The device of claim 1, wherein the bus waveguide is comprised of silicon nitride.

6. The device of claim 1, wherein the first upper waveguide and the second upper waveguide are configured to hybridize transverse magnetic mode light, introduced into the first end of the bus waveguide, to transverse electric mode light.

7. The device of claim 1, wherein the first upper waveguide and the second upper waveguide are configured to pass transverse electric mode light introduced into the first end of the bus waveguide.

8. The device of claim 1, wherein, toward the first end, a position of inner edges of the first upper waveguide and the second upper waveguide remains substantially unchanged relative to the longitudinal axis as the first upper waveguide and the second upper waveguide extend from the first end to the second end.

9. The device of claim 1, wherein outer edges of the first upper waveguide and the second upper waveguide translate away from the longitudinal axis as the first upper waveguide and the second upper waveguide extend from the first end to the second end.

10. The device of claim 1, further comprising an adiabatic 2×2 coupler optically coupled to output ends of the first upper waveguide and the second upper waveguide.

11. A device, comprising:
a bus waveguide having a first end and a second end; and
a pair of waveguides that overlie the bus waveguide and that are translated over the bus waveguide, a first one of the pair of waveguides having a first inner arcuate edge and a first outer arcuate edge and a second one of the pair of waveguides having a second inner arcuate edge and a second outer arcuate edge,
wherein the first one of pair of waveguides and the second one of the pair of waveguides symmetrically bend toward each other and then away from each other across a longitudinal axis of the bus waveguide proximate the second end of the bus waveguide, such that an inner distance between the first inner arcuate edge and the second inner arcuate edge decreases and then increases as the first one of the pair of waveguides and the second one of the pair of waveguides extend from the first end to the second end, and such that an outer distance between the first outer arcuate edge and the second outer arcuate edge decreases and then increases as the first one of the pair of waveguides and the second one of the pair of waveguides extend from the first end to the second end, and
wherein at least the first inner arcuate edge and the second inner arcuate edge overlap the bus waveguide.

12. The device of claim 11, wherein the pair of waveguides widens as the pair of waveguides extends from the first end of the bus waveguide to the second end of the bus waveguide.

13. The device of claim 11, wherein the bus waveguide is configured to carry transverse electric optical mode light and transverse magnetic optical mode light.

14. The device of claim 11, wherein the bus waveguide is comprised of silicon nitride.

15. The device of claim 11, wherein the pair of waveguides is configured to hybridize transverse magnetic mode light, introduced into the first end of the bus waveguide, to transverse electric mode light.

16. The device of claim 11, wherein a position of inner edges of the pair of waveguides, toward the first end, remains substantially unchanged relative to the longitudinal axis of the bus waveguide as the pair of waveguides extend from the first end to the second end.

17. The device of claim 11, wherein outer edges of the pair of waveguides translate away from a longitudinal axis of the bus waveguide as the pair of waveguides extend from the first end to the second end.

18. A device comprising:
a bus waveguide having a first end and a second end, the first end configured to receive both transverse electric mode light and transverse magnetic mode light, the bus waveguide extending in a longitudinal direction along a longitudinal axis and narrowing to a tip towards the second end; and
a pair of waveguides that overlie the bus waveguide and that are translated over the bus waveguide,
wherein a first one of the pair of waveguides has a first inner arcuate edge and a first outer arcuate edge and a second one of the pair of waveguides has a second inner arcuate edge and a second outer arcuate edge, and
wherein the first one of the pair of waveguides and the second one of the pair of waveguides symmetrically bend toward each other and then away from each other across the longitudinal axis of the bus waveguide proximate the second end of the bus waveguide, such that an inner distance between the first inner arcuate edge and the second inner arcuate edge decreases and then increases as the first one of the pair of waveguides and the second one of the pair of waveguides extend from the first end to the second end, and such that an outer distance between the first outer arcuate edge and the second outer arcuate edge decreases and then increases as the first one of the pair of waveguides and the second one of the pair of waveguides extend from the first end to the second end, and wherein at least the first inner arcuate edge and the second inner arcuate edge overlap the bus waveguide.

19. The device of claim 18, wherein each of the first one of the pair of waveguides and the second one of the pair of waveguides widens as the pair of waveguides extend from the first end to the second end.

20. The device of claim 18, wherein the device is configured to output transverse electric mode light via the pair of waveguides by hybridizing the transverse magnetic mode light to transverse electric mode light.

* * * * *